(12) United States Patent
Baldwin et al.

(10) Patent No.: US 6,601,485 B2
(45) Date of Patent: Aug. 5, 2003

(54) DUAL BRAKE ROTOR FINISHING SYSTEM

(76) Inventors: Paul R. Baldwin, 17870 Copper Queen La., Perris, CA (US) 92570; David N. Wong, 2041 Davie Ave., Commerce, CA (US) 90040; John Guariglio, 6508 Columbia Falls Ct., Las Vegas, NV (US) 89149

( * ) Notice: Subject to any disclaimer, the term of this patent is extended or adjusted under 35 U.S.C. 154(b) by 0 days.

(21) Appl. No.: 09/866,376

(22) Filed: May 24, 2001

(65) Prior Publication Data

US 2002/0174752 A1 Nov. 28, 2002

(51) Int. Cl.[7] ............... B23B 5/04; B23B 31/00
(52) U.S. Cl. ............... 82/112; 82/165; 82/168
(58) Field of Search ............ 82/165, 166, 168, 82/167, 173, 112, 113, 118, 129; 279/114, 115, 116, 126, 137, 141

(56) References Cited

U.S. PATENT DOCUMENTS

| | | | | |
|---|---|---|---|---|
| 2,528,442 A | * | 10/1950 | Leifer | 279/114 |
| 2,581,474 A | * | 1/1952 | Evangelista | 279/114 |
| 2,905,476 A | * | 9/1959 | Brainerd | 279/116 |
| 3,592,089 A | | 7/1971 | Skrentner | |
| 4,693,148 A | * | 9/1987 | Lobley | 279/114 |
| 4,801,226 A | | 1/1989 | Gleason | |
| 4,914,867 A | | 4/1990 | Saito et al. | |
| 5,224,303 A | | 7/1993 | Baldwin | |
| 6,173,630 B1 | * | 1/2001 | Wu | 82/129 |
| 6,199,462 B1 | * | 3/2001 | Hallett | 82/113 |

* cited by examiner

Primary Examiner—Henry W. H. Tsai
(74) Attorney, Agent, or Firm—Sheldon & Mak

(57) ABSTRACT

A brake rotor refinishing system provides simultaneously refinishing of two workpieces that are clamped at opposite ends of a duplex chuck, when the chuck is installed on a machine spindle. The duplex chuck has respectives sets of jaws that are independently driven by separate pinion elements. In the case of disk brake rotors, opposite sides of both workpieces are finished simultaneously. The system also includes a refinishing machine that incorporates the spindle and a machining mechanism having cutting elements for simultaneously refinishing opposite sides of a pair of disk rotors.

19 Claims, 3 Drawing Sheets

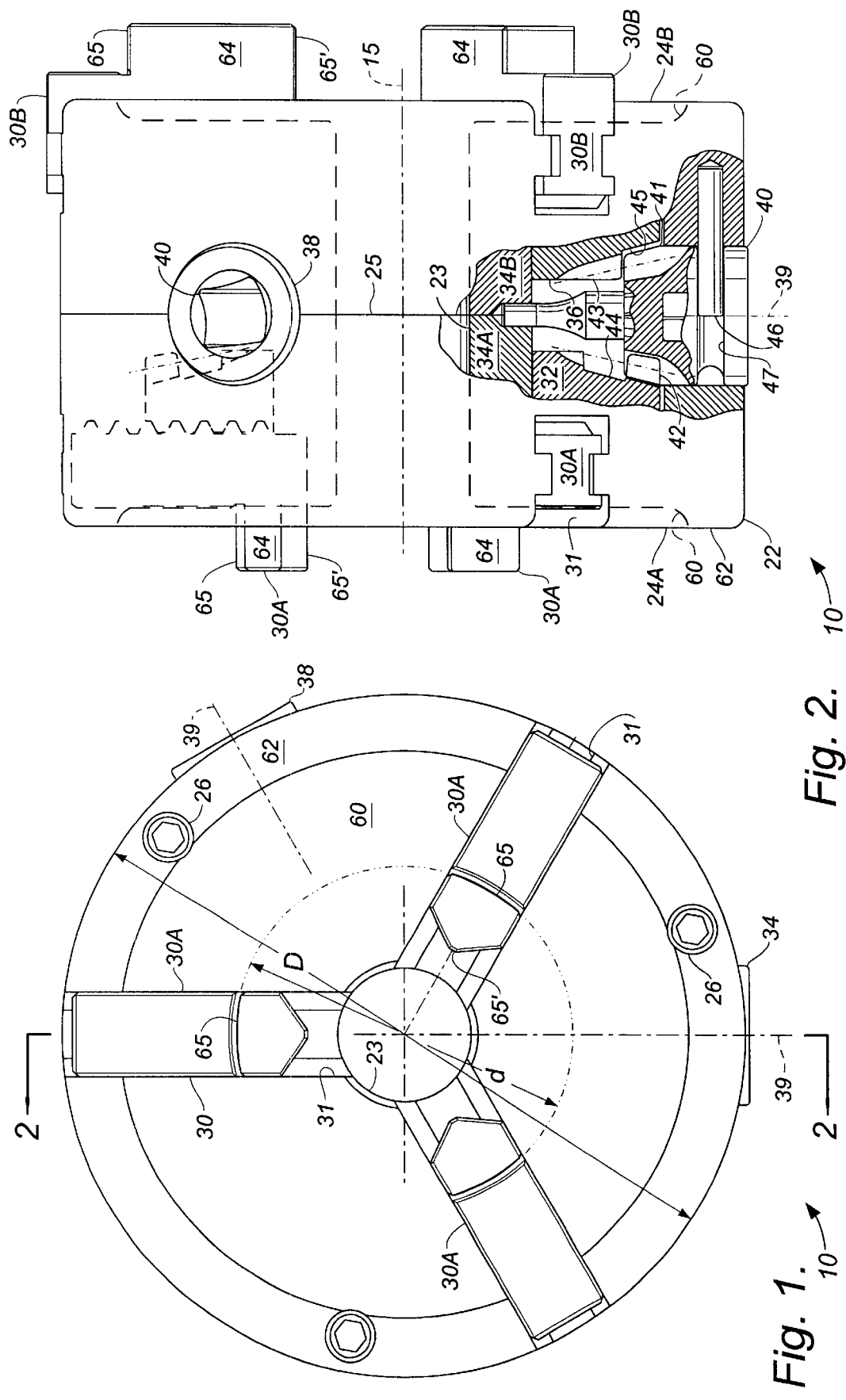

DUAL BRAKE ROTOR FINISHING SYSTEM

BACKGROUND

The present invention relates to the finishing, balancing, and especially the refinishing of worn surfaces on rotor members such as disk brake rotors, brake drums, and the like.

U.S. Pat. No. 5,224,303 to Baldwin discloses prior art arrangements for refinishing variously configured brake rotors and the like, and an adopter including flange members having shoulder surfaces of differing diameter for centering respectively configured rotor workpieces. The '303 patent, which is incorporated herein by this reference, also discloses another adapter having movable jaw members for radially clamping a centering hole of a workpiece.

While the variously configured adapters disclosed in the '303 patent provide significant advantages over earlier prior art, further improvements are desired, particularly regarding the ease and quickness of set-up operations for differently configured rotors, and reducing refinishing time.

Thus there is a need for a rotor refinishing system that further overcomes the disadvantages of the earlier prior art.

SUMMARY

The present invention meets this need by providing a duplex chuck rotor refinishing system for enhanced processing efficiency. In one aspect of the invention, the apparatus includes a duplex chuck for refinishing differently configured rotor workpieces on a spindle member having a clamping arbor nut, each rotor workpiece having a centering diameter and a rotor mounting surface, the duplex chuck including a chuck body having a body bore for locating on the spindle member and rotation therewith, respective pluralities of radially oriented first and second jaw slots being formed in respective opposite ends of the chuck body; respective sets of first and second chuck jaws for slidably engaging the first and second jaw slots of the chuck body, the jaw members of each set having respective shoulder surfaces for engaging the centering diameter of one of the rotor workpieces; first and second scroll members rotatably mounted in the body for radially advancing corresponding first and second chuck jaws when the jaws are engaging the first and second jaw slots; a first pinion member rotatably mounted in the chuck body and having geared engagement with the first scroll member for rotation thereof; and a second pinion member rotatably mounted in the chuck body and having geared engagement with the second scroll member for rotation thereof, the pluralities of first and second chuck jaws being independently advanceable in response to corresponding rotation of the first and second pinion members. The first and second pinion members can be rotatable on respective pinion axes, the pinion axes preferably extending in a common plane perpendicular to the body bore for facilitating low-cost manufacture of the chuck.

At least some of the centering diameters can be inside diameters, the shoulder surfaces of at least one of the sets of chuck jaws facing outwardly for engaging the inside diameter of a workpiece. Preferably the duplex chuck also includes flange means for axially locating respective rotor workpieces relative to the opposite ends of the chuck body. The flange means can include an annular first clamp surface formed on a front axial extremity of the chuck body, the shoulder surfaces of the first jaw members projecting forwardly of the first clamp surface for engaging the centering diameter of a first one of the workpieces, the shoulder surfaces preferably also extending rearwardly of the first clamp surface and the first jaw members having clearance behind the first clamp surface for permitting facing contact between the first clamp surface and the first one of the workpieces. The flange means can further include an annular second clamp surface formed on a rear axial extremity of the chuck body, the shoulder surfaces of the second jaw members projecting rearwardly of the second clamp surface for engaging the centering diameter of a second one of the workpieces, the shoulder surfaces of the second jaw members preferably also extending forwardly of the second clamp surface and the second jaw members having clearance forwardly of the second clamp surface for permitting facing contact between the second clamp surface and the second one of the workpieces. Alternatively, the flange means can include the first jaw members having respective face surfaces formed thereon for defining a first face plane perpendicular to the body bore when the first jaw members are engaging the first jaw slots, the shoulder surfaces of the first jaw members projecting outwardly from the first face plane. Also, the second jaw members can have respective face surfaces formed thereon to define a second face plane perpendicular to the body bore when the second jaw members are engaging the second jaw slots, the shoulder surfaces of the second jaw members projecting outwardly from the second face plane.

Preferably the duplex chuck is provided in combination with first and second flange members having respective flange inside diameters for locating on the spindle, and respective flange faces formed perpendicular to the flange inside diameters, for axially clamping respective rotor workpieces against the flange means when the flange members are axially clamped on the spindle toward the opposite ends of the chuck body with the rotor workpieces engaging corresponding first and second chuck jaws.

In another aspect of the invention, apparatus for refinishing the rotor workpieces includes a base; a powered spindle supported relative to the base and having a spindle diameter; a duplex chuck having a chuck body for mounting on the spindle diameter, respective sets of first and second jaw members being radially movable at high mechanical advantage relative to opposite ends of the chuck body for radially clampingly locating respective first and second rotor workpieces concentrically relative to the spindle; and machining means for shaping surfaces of the first and second rotor workpieces when the workpieces are being turned by the spindle. The apparatus preferably also includes the first and second flange members for axially clamping respective rotor workpieces against opposite surfaces of the duplex chuck. The machining means preferably includes first and second machine elements that are simultaneously advanceable relative to respective ones of the rotor workpieces for simultaneously refinishing the workpieces. At least some of rotor workpieces can be disk rotors having oppositely facing disk surfaces, each of the first and second machine elements preferably including respective cutters for engaging the disk surfaces of a corresponding rotor workpiece, and means for moving the cutters axially relative to the base, for facilitating finishing of two pairs of surfaces of the workpieces. Preferably at least one of the first and second machine elements further includes means for adjusting an axial spacing of the cutters. The machining means can include crossfeed means for advancing the cutters radially relative to the spindle, and the crossfeed means is preferably operative for simultaneous radial advancement of the first and second machine elements.

In a further aspect of the invention, apparatus for refinishing the differently configured rotor workpieces includes a duplex chuck having a chuck body for mounting on the spindle diameter, respective sets of first and second jaw members being radially movable at high mechanical advantage relative to opposite ends of the chuck body for radially clampingly locating respective first and second rotor workpieces concentrically relative to the spindle; and the first and second flange members for axially clamping the workpieces against first and second face planes of the chuck.

DRAWINGS

These and other features, aspects, and advantages of the present invention will become better understood with reference to the following description, appended claims, and accompanying drawings, where:

FIG. 1 is an end view of a duplex chuck for refinishing rotor workpieces according to the present invention;

FIG. 2 is a fragmentary sectional view of the duplex chuck of FIG. 1 on line 2—2 therein;

DESCRIPTION

Figure 3:
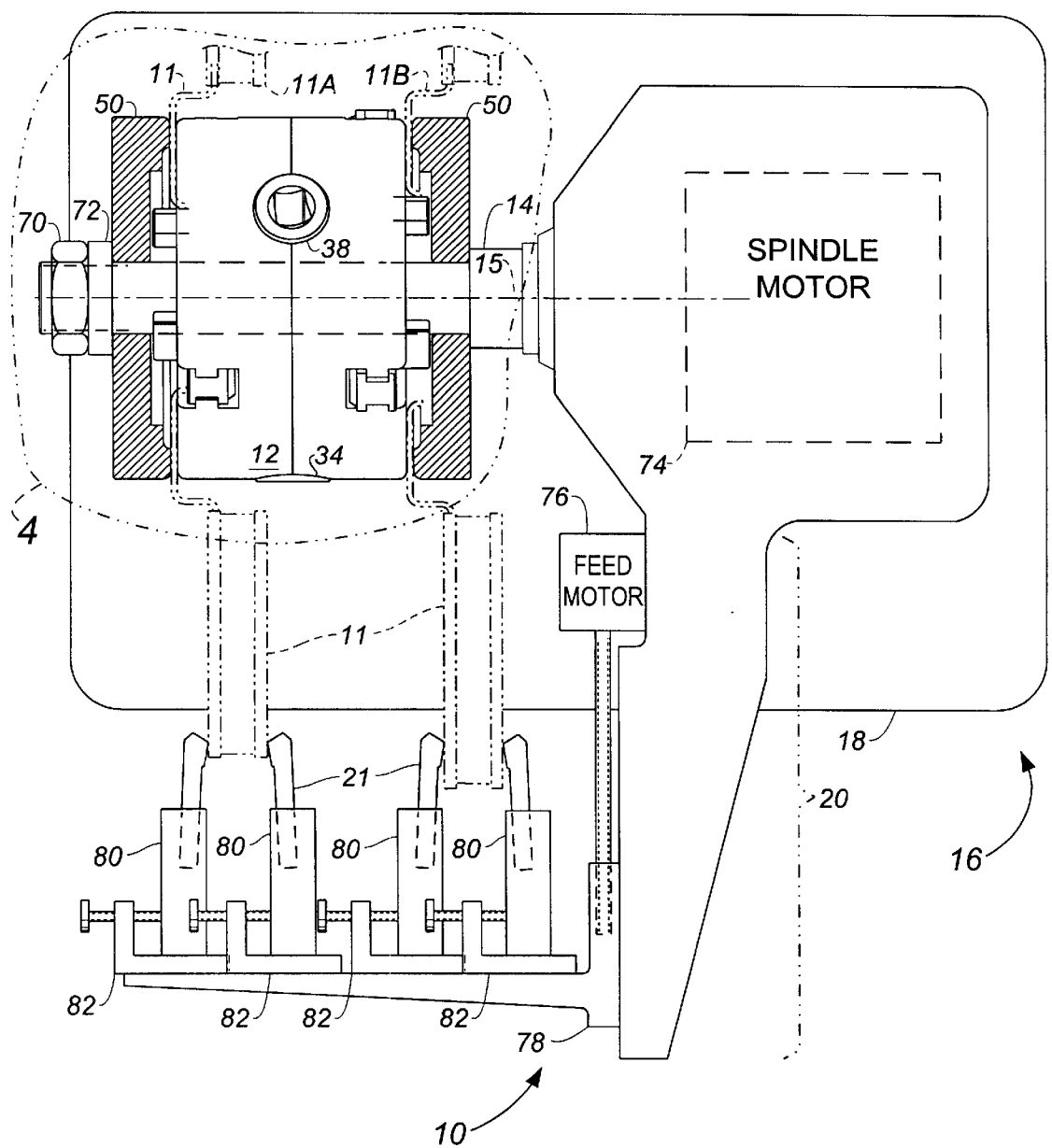
FIG. 3 is a plan view of a rotor refinishing system incorporating the duplex chuck of FIG. 1.

The present invention is directed to a duplex chuck for mounting workpieces such as vehicle brake rotors to be refinished, and a refinishing system that incorporates the duplex chuck. With reference to FIGS. 1–4 of the drawings, a refinishing system 10 is shown with a pair of rotor workpieces 11 being mounted by a duplex chuck 12 on a powered spindle 14 of a refinishing machine 16 for being rotationally driven thereby. The machine 16 has a base 18 that supports the spindle 14 in a spindle axis 15, and a machining mechanism 20 that movably supports one or more machine elements 21 that can be cutting tools, or powered grinding wheels such as are suitable for truing wear surfaces of the workpieces 11 as further described below. The duplex chuck 12, which is best shown in FIGS. 1 and 2, advantageously provides convenient and rapid mounting of two of the workpieces 11 at a time.

According to the present invention, the duplex chuck 12 includes a generally cylindrical chuck body 22 that has a concentric body bore 23 that is formed in a front chuck body 24A and a rear chuck body 24B, the chuck bodies 24A and 24B having an outside diameter D and being axially fastened together at an assembly plane 25 by a plurality of body fasteners 26 as shown in FIGS. 1 and 2. The duplex chuck 12 has respective sets of movable chuck jaws 30 slidably engaging respective jaw slots 31 at opposite ends of the chuck body 22 as described herein, the front chuck body 24A having three equally angularly spaced first chuck jaws 30A that are advanceable at high mechanical advantage for radially clamping one of the workpieces, designated first workpiece 11A, by a first scroll disk 32 that has geared engagement with a first pinion 34 in the manner described in the above referenced U.S. Pat. No. 5,224,303 to Baldwin. It will be understood that the term "radial" as used herein means in a direction having a component normal to the spindle axis 15 (or the body bore 23 when the duplex chuck 12 is not supported on the spindle axis. The rear body 24B has a set of second chuck jaws 30B that are similarly advanceable by a second scroll disk 36 having geared engagement with a second pinion 36. The first and second pinions 34 and 38 are journaled between the front and rear chuck bodies 24A and 24B on respective pinion axes 39 that are located in the assembly plane 25, the first and second scroll disks 32 and 36 being equally spaced on opposite sides of the assembly axis 25. Independent operation of the first chuck jaws 30A by the first pinion 34, and of the second chuck jaws 30B by the second pinion 38, is made possible by axially offset teeth of the pinions 34 and 38 engaging radially offset gear teeth of the first and second scroll disks 32 and 36 as shown in FIG. 2.

More particularly, each of the pinions 34 and 38 has an enlarged and exposed socket end 40 for engagement in a conventional manner by a suitable chuck key (not shown). Pinion teeth 41 of the first pinion 34 are confined proximate the socket end 40, being engaged by gear teeth 42 of the first scroll disk 32, the gear teeth 42 being confined to a relatively narrow peripheral region of the first scroll disk 32. Conversely, gear teeth 43 of the second scroll disk 36 are confined to a radially inwardly displaced region for independently engaging gear teeth (not shown) of the second pinion that are axially displaced on the second pinion 38 in a manner complementary to the configuration of the first pinion 34. It will be understood that this arrangement of the first and second pinions 34 and 38 and the first and second scroll disks differs from conventional practice in conventional three-jaw chucks, which typically have three radially disposed pinions that each engage a single scroll disk, whereby the chuck key is equally effective for advancing the jaws using any one of the pinions. In the exemplary configuration of the dual chuck 12 described herein, the difference is provided by the undercuts 44 and 45 of the scroll disk gear teeth 42 and 43. It will be understood that other means for independent drive of the first and second chuck jaws 30A and 30B are possible, such as by increasing the distance between the scroll disks 32 and 36 and laterally offsetting the first and second pinions 34 and 38.

Fabrication of the duplex chuck 12, at least in small quantities, is facilitated by modifying conventional pinions and scroll disks with selective removal of complementary portions of respective pinion and gear teeth. Specifically, the first pinion 34 has portions of the pinion teeth 41 removed by an undercut 44, and the first scroll disk has inward portions of the gear teeth 42 removed by an undercut 45, the second scroll disk 36 having outward portions of the gear teeth 43 removed by an undercut 45, the second pinion 38 having a corresponding undercut (not shown), the respective undercuts being effective for permitting independent advancement of the first jaw members 30A relative to the second jaw members 30B. The pinions 34 and 38 are axially retained by respective dowel pins 46 that project into complementary grooves 47 of the pinions 34 and 38. The front chuck body 24A can be that of a conventional three-jaw chuck, having counterbored clearance openings for the fasteners 26, but preferably modified to provide an annular flange surface as described below. The rear chuck body 24B can be identical to the front chuck body 24A, except for being threaded for engagement by the fasteners 26.

Figure 4:
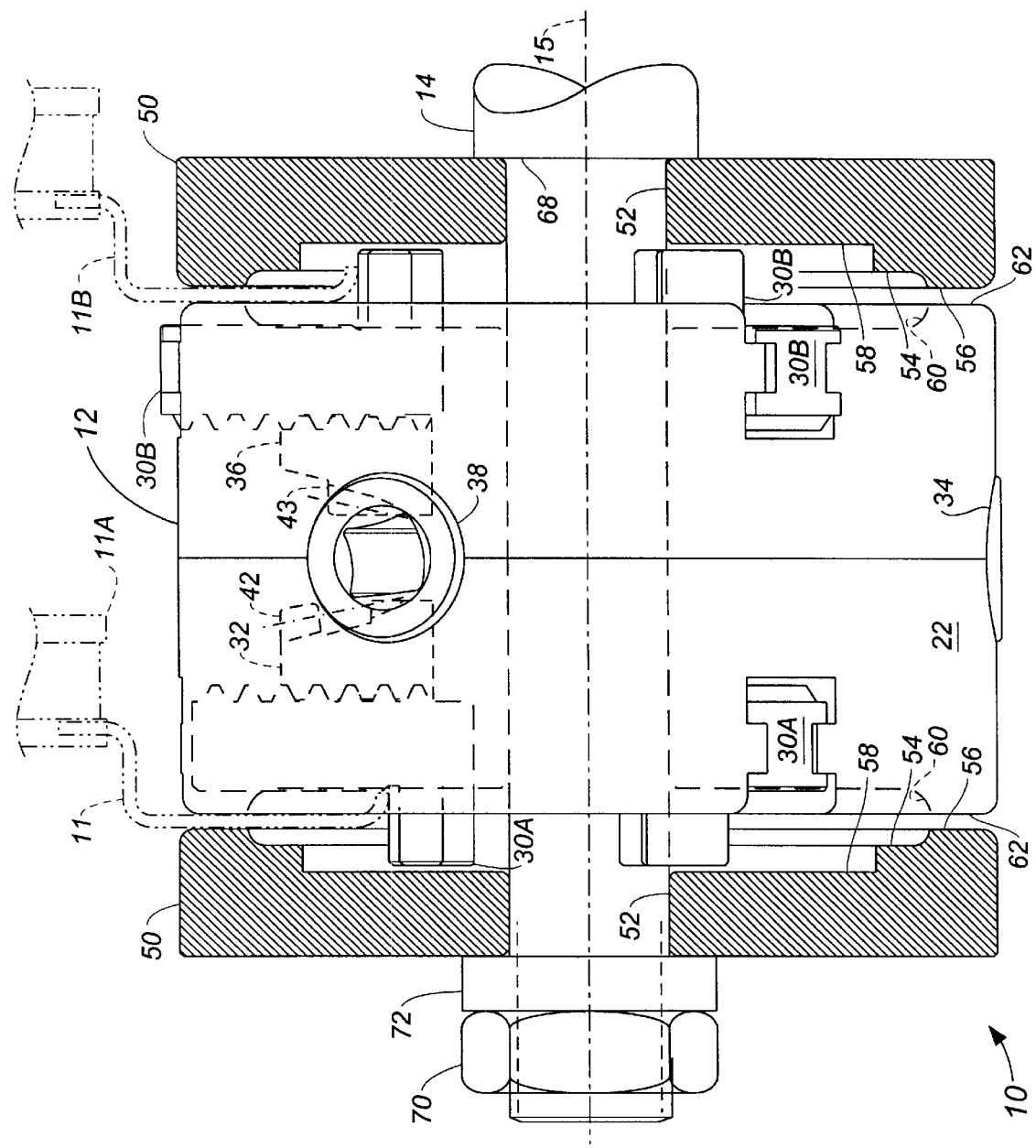
FIG. 4 is a fragmentary sectional view of the system of FIG. 3 within region 4 therein.

Preferably, the dual chuck 12 is used in combination with a pair of flange members 50 for axially clamping the workpieces 11 as best shown in FIG. 4, in addition to the above-described radial clamping, the axial clamping insuring against wobbling and/or warping of the workpieces 11. The flange members 50 are each formed in a manner described in the above-referenced '303 patent, having a flange bore 52 for engagement with the spindle 14, a clamp cavity 54 defining an annular flange surface 56, a portion of the clamp cavity 54 being optionally enlarged axially by an annular clearance cavity 58. Correspondingly, the chuck body 22 has a shallow counterbore 60 formed at opposite ends thereof, in each of the front and rear chuck bodies 24A and 24B to form respective annular clamp surfaces 62 of the duplex chuck 12.

As further shown in FIG. 2, the first chuck jaws 30A each have an axially outwardly extending projection 64 that forms a radially outwardly facing jaw shoulder 65 for clamped engagement with an inside diameter d of the rotor workpiece 11. The jaw shoulders 65 extend axially within the counterbore 60 behind the clamp surface 62, an annular portion of the first workpiece 11A being clamped between the clamp surface 56 of the corresponding flange member 50 and the flange surface 62 of the front chuck body 24A as described below. The second chuck jaws 30B, which have counterparts of the outwardly facing jaw shoulders, are shown to have respective coplanar land surfaces 64 that project axially outwardly from and parallel to the corresponding clamp surface 62 of the rear body 24B, the land surfaces 64 superceding the associated clamp surface 62. It will be understood that while the configuration of the first chuck jaws 30A advantageously facilitates precise alignment of the first workpiece 11A perpendicular to the spindle axis 15, good alignment of the second workpiece 11B is also possible, provided that the land surfaces 64 are precisely aligned in the clamped condition of the second workpiece 11B. Further, the duplex chuck 12 can be provided with both sets of the jaws 30 configured as either the first or second chuck jaws 30A and 30B. As more fully described in the above-referenced '303 patent, the outwardly facing jaw shoulders 65 engage an inside diameter of the rotor workpieces 11. The first and second chuck jaws 30A and 30B also have inwardly facing counterparts of the jaw shoulders, designated 65', which may be used for engaging the outside diameter of a projecting portion of the rotor workpiece 11. Moreover, the chuck jaws 30 are preferably reversible in radial orientation for providing plural overlapping size ranges of radial clamping engagement. It will be understood that reversal of a set of chuck jaws effectively reverses the identity of the jaw shoulders 65 and 65'.

As shown in FIGS. 3 and 4, mounting of the workpieces 11 on the spindle 14 can include assembly of one of the flange members 50 into the spindle against a shoulder surface 68 thereof, loading the second rotor workpiece 11B onto the second chuck jaws 30B of the duplex chuck 12, clamping the workpiece 11B by rotation of the second pinion 38, and loading the chuck 12 together with the workpiece 11B onto the spindle with the workpiece 11B facing toward the assembled flange member 50. At this time, or earlier if desired, the first rotor workpiece can be installed onto the first chuck jaws 30A and clamped thereby. This clamping by the first and second chuck jaws is understood to be a preliminary clamping in that further, axial, clamping is to follow. Thus the preliminary clamping can be with light to moderate force, and/or the preliminary clamping can be partially released during the subsequent axial clamping. The axial clamping is is done by assembling another flange member 50 onto the spindle 14 with the clamp surface 56 facing the first rotor workpiece, followed by a spindle nut 70 (together with washers or spacers 72 as appropriate), the nut 70 being tightened to effect simultaneous axial clamping of the rotor workpieces 11A and 11B between respective clamp surfaces 56 of the flanges 50 and flange surfaces 62 of the duplex chuck 12. Preferably the axial and radial clamping is reached progressively in an alternating or simultaneous fashion that is within the ordinary skill of machine operators, to achieve a secure and accurate mounting of the rotor workpieces 11.

As further shown in FIG. 3, the spindle 14 is conventionally coupled to a spindle motor 74 of the refinishing machine 16, the machining mechanism including a feed motor 76 that provides powered advancement of a cross-slide carriage 78. Each of the machine elements 21 is rigidly supported by a tool carriage 80, the tool carriages 80 being themselves axially adjustably supported on respective slide mechanisms 82. The slide mechanisms 82 are mounted to the cross-slide carriage 78 in positions appropriate for machining opposite sides of both rotor workpieces 11A and 11B. Thus the refinishing system 10 of the present invention advantageously provides simultaneous finishing of two pairs of workpiece surfaces for enhanced productivity. As indicated in FIG. 3, the slide mechanisms 82 are displaced circumferentially about the spindle axis 15 to provide clearance and access thereto. It will be understood that the mounting of the slide mechanisms 82 preferably incorporates coarse axial adjustment for accommodating a wide variety of workpiece configurations, the slide mechanisms providing fine axial movement at high mechanical advantage for controlling cutting depths of the machine elements 21.

Although the present invention has been described in considerable detail with reference to certain preferred versions thereof, other versions are possible. For example, the machining mechanism 16 can pivotally support the slide mechanisms 82 on an axis that is parallel to and spaced from the spindle axis. Further, the slide mechanisms 82 can be supported in pairs on respective pivoting arms that are driven simultaneously by a counterpart of the feed motor 76. Also, the refinishing machine 16 can be configured for refinishing a pair of brake drums simultaneously, a pair of the slide mechanisms 82 being oriented for radial movement, the cross-slide carriage 78 being oriented for axial movement, the feed motor 76 being coupled preferably for oppositely driving the axial movement of the slide mechanisms, so that the feeding of the machine elements 21 is in the same direction relative to brake drums clamped in oppositely facing relation on the spindle 14. Therefore, the spirit and scope of the appended claims should not necessarily be limited to the description of the preferred versions contained herein.

What is claimed is:

1. A duplex chuck for refinishing differently configured rotor workpieces on a spindle member having a clamping arbor nut, each rotor workpiece having a centering diameter and a rotor mounting surface, the duplex chuck comprising:

(a) a chuck body having a body bore for locating on the spindle member and rotation therewith, respective pluralities of radially oriented first and second jaw slots being formed in respective opposite ends of the chuck body;

(b) respective sets of first and second chuck jaws for slidably engaging the first and second jaw slots of the chuck body, the jaw members of each set having respective shoulder surfaces for engaging the centering diameter of one of the rotor workpieces;

(c) first and second scroll members rotatably mounted in the body for radially advancing corresponding first and second chuck jaws when the jaws are engaging the first and second jaw slots;

(d) a first pinion member rotatably mounted in the chuck body and having geared engagement with the first scroll member for rotation thereof; and (e) a second pinion member rotatably mounted in the chuck body and having geared engagement with the second scroll member for rotation thereof, the pluralities of first and second chuck jaws being independently advanceable in response to corresponding rotation of the first and second pinion members.

2. The duplex chuck of claim 1, wherein the first and second pinion members are rotatable on respective pinion axes, the pinion axes extending in a common plane perpendicular to the body bore.

3. The duplex chuck of claim 1, wherein at least some of the centering diameters are inside diameters, and the shoulder surfaces of at least one of the sets of chuck jaws face outwardly.

4. The duplex chuck of claim 1, further comprising flange means for axially locating respective rotor workpieces relative to the opposite ends of the chuck body.

5. The duplex chuck of claim 4, wherein the flange means comprises an annular first clamp surface formed on a front axial extremity of the chuck body, the shoulder surfaces of the first jaw members projecting forwardly of the first clamp surface for engaging the centering diameter of a first one of the workpieces, the shoulder surfaces also extending rearwardly of the first clamp surface and the first jaw members having clearance behind the first clamp surface for permitting facing contact between the first clamp surface and the first one of the workpieces.

6. The duplex chuck of claim 5, wherein the flange means further comprises an annular second clamp surface formed on a rear axial extremity of the chuck body, the shoulder surfaces of the second jaw members projecting rearwardly of the second clamp surface for engaging the centering diameter of a second one of the workpieces, the shoulder surfaces of the second jaw members also extending forwardly of the second clamp surface and the second jaw members having clearance forwardly of the second clamp surface for permitting facing contact between the second clamp surface and the second one of the workpieces.

7. The duplex chuck of claim 4, wherein the flange means comprises the first jaw members having respective face surfaces formed thereon for defining a first face plane perpendicular to the body bore when the first jaw members are engaging the first jaw slots, the shoulder surfaces of the first jaw members projecting outwardly from the first face plane.

8. The duplex chuck of claim 7, wherein the flange means further comprises the second jaw members having respective face surfaces formed thereon for defining a second face plane perpendicular to the body bore when the second jaw members are engaging the second jaw slots, the shoulder surfaces of the second jaw members projecting outwardly from the second face plane.

9. The duplex chuck of claim 4, in combination with first and second flange members having respective flange inside diameters for locating on the spindle, and respective flange faces formed perpendicular to the flange inside diameters, for axially clamping respective rotor workpieces against the flange means when the flange members are axially clamped on the spindle toward the opposite ends of the chuck body with the rotor workpieces engaging corresponding first and second chuck jaws.

10. An apparatus for refinishing differently configured rotor workpieces on a spindle member having a clamping arbor nut, each rotor workpiece having a centering diameter and a rotor mounting surface, the apparatus comprising:

(a) a base;

(b) a powered spindle supported relative to the base and having a spindle diameter;

(c) a duplex chuck having a chuck body for mounting on the spindle diameter, respective sets of first and second jaw members being radially movable at high mechanical advantage relative to opposite ends of the chuck body for radially clampingly locating respective first and second rotor workpieces concentrically relative to the spindle; and (d) machining means for shaping surfaces of the first and second rotor workpieces when the workpieces are being turned by the spindle.

11. The apparatus of claim 10, further comprising first and second flange members having respective flange inside diameters for locating on the spindle, and respective flange faces formed perpendicular to the flange inside diameters, for axially clamping respective rotor workpieces against opposite surfaces of the duplex chuck when the flange members are axially clamped on the spindle toward the opposite ends of the chuck body with the rotor workpieces engaging corresponding first and second chuck jaws.

12. The apparatus of claim 10, wherein the machining means comprises first and second machine elements being simultaneously advanceable relative to respective ones of the rotor workpieces for simultaneously refinishing the workpieces.

13. The apparatus of claim 12, wherein at least some of rotor workpieces are disk rotors having oppositely facing disk surfaces, and each of the first and second machine elements comprises respective cutters for engaging the disk surfaces of a corresponding rotor workpiece, and means for moving the cutters axially relative to the base.

14. The apparatus of claim 13, wherein at least one of the first and second machine elements further comprises means for adjusting an axial spacing of the cutters.

15. The apparatus of claim 10, wherein the machining means comprises crossfeed means for advancing the cutters radially relative to the spindle.

16. The apparatus of claim 15, wherein the crossfeed means is operative for simultaneous radial advancement of the first and second machine elements.

17. An apparatus for refinishing differently configured rotor workpieces on a spindle member having a clamping arbor nut, each rotor workpiece having a centering diameter and a rotor mounting surface, the apparatus comprising:

(a) a duplex chuck having a chuck body for mounting on the spindle diameter, respective sets of first and second jaw members being radially movable at high mechanical advantage relative to opposite ends of the chuck body for radially clampingly locating respective first and second rotor workpieces concentrically relative to the spindle, the chuck having oppositely facing face planes for contacting the rotor workpieces perpendicular to the spindle when the chuck is mounted on the spindle member; and (b) first and second flange members having respective flange inside diameters for locating on the spindle, and respective flange faces formed perpendicular to the flange inside diameters, for axially clamping respective rotor workpieces against the first and second face planes when the flange members are axially clamped on the spindle toward the opposite ends of the chuck body with the rotor workpieces engaging corresponding first and second chuck jaws.

18. The apparatus of claim 17, wherein the machining means comprises first and second machine elements being simultaneously advanceable relative to respective ones of the rotor workpieces for simultaneously refinishing the workpieces.

19. An apparatus for refinishing differently configured rotor workpieces on a spindle member having a clamping arbor nut, each rotor workpiece having a centering diameter and a rotor mounting surface, the apparatus comprising:

(a) a duplex chuck comprising:
  (i) a chuck body having a body bore for locating on the spindle member and rotation therewith, respective pluralities of radially oriented first and second jaw slots being formed in respective opposite ends of the chuck body;
  (ii) respective sets of first and second chuck jaws for slidably engaging the first and second jaw slots of the chuck body, the jaw members of each set having respective shoulder surfaces for engaging the centering diameter of one of the rotor workpieces;
  (iii) first and second scroll members rotatably mounted in the body for radially advancing corresponding first and second chuck jaws when the jaws are engaging the first and second jaw slots;
  (iv) a first pinion member rotatably mounted in the chuck body and having geared engagement with the first scroll member for rotation thereof;
  (v) a second pinion member rotatably mounted in the chuck body and having geared engagement with the second scroll member for rotation thereof,
    the pluralities of first and second chuck jaws being independently advanceable in response to corresponding rotation of the first and second pinion members a base, the first and second pinion members being rotatable on respective pinion axes, the pinion axes extending in a common plane perpendicular to the body bore; and
  (vi) annular clamp surfaces formed on opposite axial extremities of the chuck body, the shoulder surfaces of the first and second jaw members projecting axially outwardly of the clamp surfaces for engaging the centering diameters of respective workpieces, the shoulder surfaces also extending axially inwardly of the clamp surfaces, and the first and second jaw members having clearance axially inwardly of respective ones the clamp surfaces for permitting facing contact between the clamp surfaces and the workpieces; and
(b) first and second flange members having respective flange inside diameters for locating on the spindle, and respective flange faces formed perpendicular to the flange inside diameters, for axially clamping respective rotor workpieces against the first and second face planes when the flange members are axially clamped on the spindle toward the apposite ends of the chuck body with the rotor workpieces engaging corresponding first and second chuck jaws.

* * * * *